United States Patent [19]

Sinclair et al.

[11] 3,864,095
[45] Feb. 4, 1975

[54] ANTI-KNOCK INJECTION FOR IN-LINE BLENDING OF GASOLINE

[75] Inventors: John T. Sinclair; Franklin P. Clark, both of Sarnia, Ontario, Canada

[73] Assignee: Exxon Research and Engineering Company, Linden, N.J.

[22] Filed: Dec. 26, 1973

[21] Appl. No.: 427,644

[52] U.S. Cl................................. 44/2, 73/35, 137/89
[51] Int. Cl........................... C10l 1/30, G05d 11/02
[58] Field of Search .................. 44/2; 73/35; 137/89

[56] References Cited
UNITED STATES PATENTS

| | | | |
|---|---|---|---|
| 3,433,606 | 3/1969 | Moore et al. | 44/2 |
| 3,437,461 | 4/1969 | Hoffman et al. | 44/2 |

Primary Examiner—Patrick P. Garvin
Attorney, Agent, or Firm—Harold N. Wells

[57] ABSTRACT

A method for adding lead alkyl anti-knock compounds during in-line gasoline blending. Rapid response to changes in octane level as measured by an octane analyzer is obtained by varying the rate of injection of a constant concentration dilute anti-knock solution. The method provides a constant concentration anti-knock solution which is prepared at the rate required to meet the desired octane level of the finished gasoline stream. Since response of the anti-knock solution injection system is substantially improved by using a constant concentration solution, the anti-knock facilities may be located far from the gasoline blending equipment.

7 Claims, 1 Drawing Figure

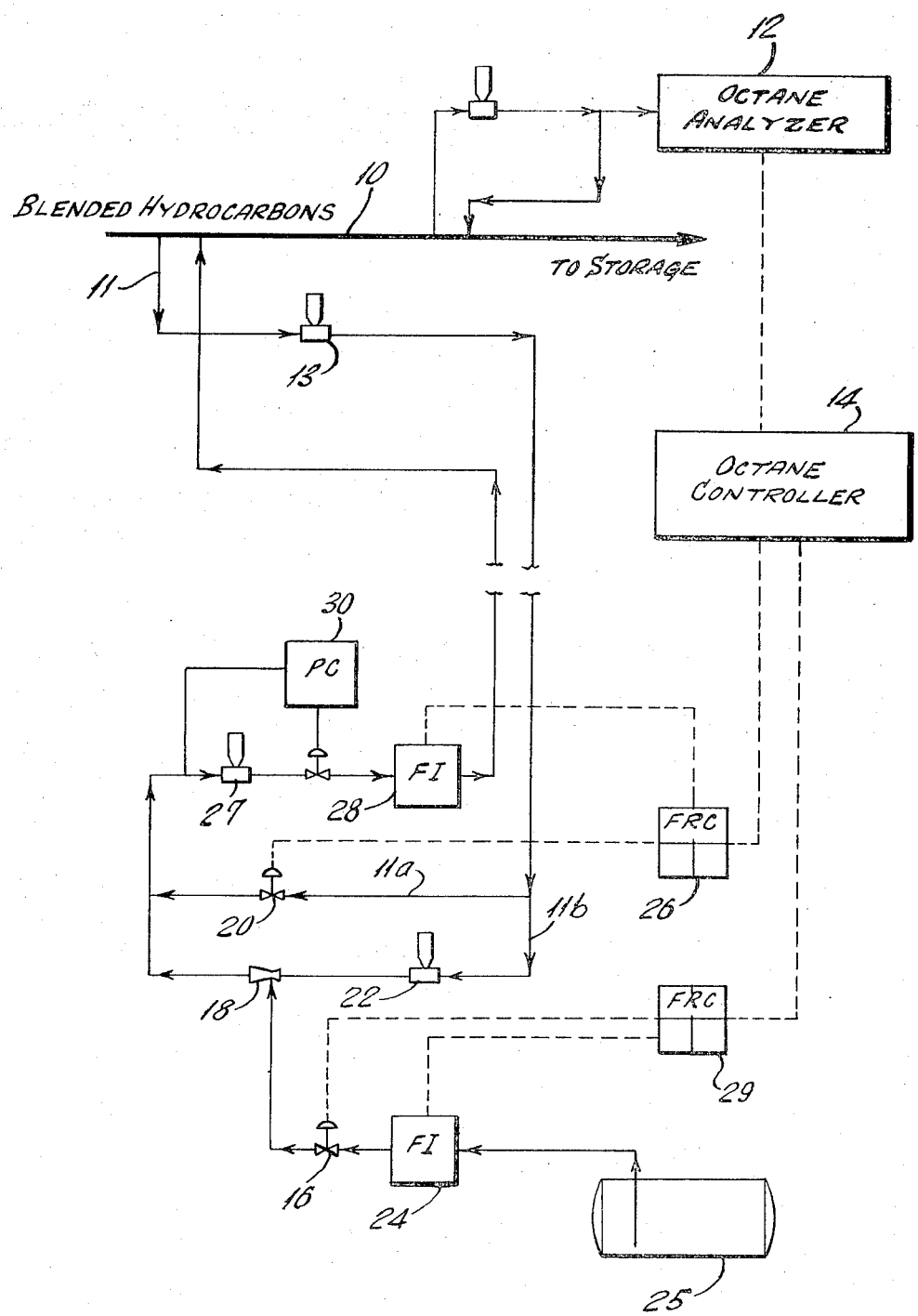

ANTI-KNOCK INJECTION FOR IN-LINE BLENDING OF GASOLINE

BACKGROUND OF THE INVENTION

The invention relates generally to a method of controlling the addition of lead alkyl anti-knock compounds to gasoline in automated in-line gasoline blending facilities. More specifically, it refers to a method of obtaining a rapid response of the anti-knock fluid injection facilities to changes in the octane level in the finished gasoline stream.

Many issued U.S. patents show the general state of the art in anti-knock fluid addition facilities. Typical of these are the following:

| 3,342,199 | 3,433,606 | 3,469,954 |
| 3,383,190 | 3,437,461 | 3,503,722 |
| 3,385,680 | 3,451,402 | |

Since lead alkyl anti-knock compounds present serious health harzards, special methods are required in handling them in their concentrated form. They are not generally pumped but are removed from storage facilities by vacuum producing eductors, which produce a dilute blending solution which is added to gasoline to adjust its octane level as required. Since unusual care must be used in handling anti-knock solutions, addition facilities are ordinarily located close to gasoline blending equipment to minimize hazards. Also, the proximity of the addition facilities permits a rapid adjustment to the rate of anti-knock solution addition as required by changes in the octane level of the finished gasoline. The above-cited U.S. patents are typical of the prior art in that they generally deal with other aspects of the addition of lead alkyl compounds to gasoline and not with the specific problem which this invention has overcome. That problem can be generally outlined as follows:

If gasoline is being blended in-line, hydrocarbon components are combined and a gasoline is produced which is sent directly into storage tanks. Thus, it is important that the finished gasoline have the correct octane level before reaching storage. The blending facilities have essentially no holdup volume and adjustments for changes in octane level must be made rapidly if automatic control is to be effective. In a typical system where a gasoline solution is used to power a vacuum eductor to draw lead alkyl compounds from a storage drum, the flow of the concentrated compounds is usually throttled between the storage drum and the eductor in response to the octane level of the gasoline. This control method produces a varying concentration of lead alkyl compounds in the dilute solution which is added to the finished gasoline. Such a procedure is quite satisfactory as long as the anti-knock compound addition facilities are located close to the point of injection to the blended gasoline stream. If, for example, a greater amount of anti-knock fluid is required, the throttling valve is opened to admit more anti-knock compound to the eductor. Shortly thereafter, the increase enters the gasoline stream. This process would increase the concentration of the anti-knock solution and, after a brief lag this solution would increase the octane level of the finished gasoline. Since octane analyzers such as are commonly used typically have a four minute cycle, good control requires that the changes in anti-knock fluid addition in response to the octane analyzer output should reach the octane analyzer in less than the four minute cycle time. This is not difficult where the anti-knock facilities are located relatively closely to the gasoline blending equipment. If, however, the anti-knock fluid facilities are located at a substantial distance from the gasoline blending equipment, the lag in response time causes a serious erosion of the octane control. It is the objective of the present invention to provide a means whereby a rapid response to changes in the octane level as indicated by the analyzer is made even when the anti-knock facilities are located far from the gasoline blending equipment.

SUMMARY OF THE INVENTION

Rapid response to changes in octane quality can be obtained by, instead of adjusting the concentration of the anti-knock solution, keeping a constant concentration and adjusting the rate of flow. By maintaining a constant concentration of lead alkyl compounds in the blending stream at all times, a change in flow rate is felt instantaneously by the gasoline stream no matter where the anti-knock compound facilities are located. This general statement of the invention is easily understood in connection with the preferred embodiments described hereinafter.

BRIEF DESCRIPTION OF THE DRAWING

The sole FIGURE shows a flow diagram of a typical application of the invention to anti-knock compound blending.

DESCRIPTION OF THE PREFERRED EMBODIMENT

Gasoline is blended from a variety of hydrocarbon feedstocks. Once this has been done, adjustment of the octane quality is made by adding anti-knock compounds, which is the subject of the invention. Facilities for blending of individual hydrocarbon components are not shown since this is not part of the invention. Blended gasoline passing through a pipeline on its way to storage tanks is sampled and measured for octane level. Octane analyzers are available commerically, for example, a DuPont or Ethyl Corp. octane comparator might be used. For such analyzers, the time between the taking of a gasoline sample and the time the octane measurement is available for control is about 4 minutes. In order to obtain good control of the octane level of the finished gasoline, it is important that any changes in the anti-knock fluid addition rate be made within the 4 minute period so that a change called for by one analysis will be reflected in the next sequential sample 4 minutes later.

It is typical to use the output of an octane analyzer to control directly the flow of concentrated lead alkyl anti-knock compound passing from its storage drum to the low pressure part of a liquid eductor. Pumps are avoided in order to minimize possibilities for spillage of these very hazardous compounds. A liquid eductor is powered by a stream of gasoline taken upstream of the anti-knock injection and returned to the main gasoline line after anti-knock compounds are added. It is clear that if a constant flow is provided through the circulation loop which operates the eductor (constant flow is required) and dilutes the concentrated anti-knock compound then, as the transfer rate of concentrated anti-knock fluid is adjusted, the concentration of the dilute solution will also vary. It then follows that the time which is required for the diluted solution to pass from the eductor to the point where it joins the main gasoline blending line is important in determining whether the control response to the octane sample is sufficiently rapid. It should be noted that inasmuch as liquid eductors are essentially constant flow rate devices, the prior art system must necessarily operate to provide a constant flow rate with a varying concentration of anti-knock compounds and will depend for its rapid response on the proximity of the eductor relative to the gasoline blending line.

If it is not possible for the anti-knock addition facilities to be located close to the gasoline blending equipment, the ability to control octane in the finished gasoline would be reduced. By means of the present invention, the characteristics of the anti-knock addition method of the prior art are reversed, thereby making the physical location of the anti-knock addition facilities of little significance. The method of the invention permits a rapid response to changes in octane no matter where the addition facilities are located. This is accomplished by blending the dilute solution to a constant concentration of lead alkyl compounds and varying the circulation rate of the dilute solution as required to obtain the desired octane level for the finished gasoline.

A constant flow of blended (but unleaded) gasoline is provided to the liquid eductor as is typical of the prior art. Also in the prior art, control of the flow of concentrated anti-knock compound to the eductor is controlled in direct response to the octane analyzer results and a dilute solution of varying concentration is produced. In order to provide a constant concentration and thus improve speed of response, the quantity of fluid flowing in the circulating loop is constantly varied, also in proportion to the octane requirement. This is done by providing a bypass conduit around the eductor facilities which operates in response to the octane analyzer output and maintains a constant ratio of the bypass flow to the flow of concentrated lead alkyl compounds passing to the eductor. This ratioing provides a constant concentration of anti-knock compounds in the dilute solution and varies the amount of dilute solution which enters the gasoline blending line to adjust the octane. When the bypass valve opens to make an adjustment to the flow rate through the circulating loop the full change in rate will be reflected instantly at the gasoline blending line, since the concentration of anti-knock compounds is the same throughout the loop and the fluid is essentially incompressible. This will be true, no matter where the bypass valve is physically located relative to the gasoline blending line.

Operation of the invention can be more easily visualized by reference to the FIGURE. The gasoline blending line 10 contains a mixture of hydrocarbons whose octane level is to be adjusted by adding lead alkyl compounds. A sample is taken and analyzed in octane analyzer 12. Suppose that the octane measured by the analyzer 12 is lower than is required. A signal is sent to the controller 14 which opens both the valve 16, permitting anti-knock fluid to pass to the eductor 18, and the bypass valve 20 in a constant ratio to the flow through valve 16. The amount of circulation stream in conduit 11 is measured by flow instrument (FI) 28. The quantity actually passing in conduit 11b to the eductor remains essentially constant. The flow is controlled by the special eductor pump acting in combination with the inherent resistance of the eductor. The eductor pump 22 shown here is preferred, although a flow control system could be used relying on the head delivered by the upstream circulating pump 13. The dilute solution immediately downstream of the eductor 18 will have a higher concentration of anti-knock fluid than before, but it is diluted to the desired constant concentration by the increase in bypass flow through the control valve 20. The increase in circulation rate which is provided by the opening of the bypass valve 20 is reflected instantly by the introduction of a greater rate into the gasoline blending line of constant concentration solution. This increase in octane will be sensed by the octane analyzer 12 when it next takes its sample from the line 10. If the octane is then satisfactory, it will so indicate to the controller 14 and no further change in the valve positions will be made. If still off target, corrections may be necessary. Once the octane level has been established, the flow controller (FRC) 26 maintains the desired circulation loop flow rate independently of the octane requirement. The amount of anti-knock compound is maintained by FRC-29. The set points of these two controllers are adjusted as necessary by octane controller 14.

Auxiliary equipment shown in the preferred embodiment but which is not essential to the understanding of the invention includes the flow meter (FI) 24 used to monitor the flow of concentrated anti-knock fluid from its storage facility 25 to the eductor 18. Also included are a pair of booster pumps 13 and 27 to assure flexibility in operation of the circulation loop. Also, in order to improve control of the operation of the eductor system and the bypass and the booster pump, a back pressure control (PC) 30 is provided immediately downstream of the booster pump 27.

Since lag in the system response to changes in octane is substantially eliminated by the invention, it is possible to locate anti-knock compound addition facilities at a substantial distance from the gasoline blending equipment. This may provide significant economic advantages as well as permitting greater safety in the handling of the concentrated anti-knock fluid compound. The foregoing description of the peferred embodiment is for illustration only and should not be considered to limit the scope of the invention which is defined by the claims which follow.

What is claimed is:

1. A method of adding a dilute solution containing a constant fraction of lead alkyl compounds to a gasoline stream after in-line blending of the hydrocarbon components thereof and before storage of said gasoline comprising the steps of:
   a. analyzing the octane value of said blended gasoline stream after the addition of said lead alkyl compounds;
   b. establishing a primary circulating loop stream for addition of lead alkyl compounds by withdrawing a portion of said gasoiline stream, adding lead alkyl compounds to said portion to produce a dilute solution, and returning said lead alkyl containing primary stream to said gasoline stream downstream of said withdrawal point;
   c. establishing secondary and tertiary streams by dividing said primary stream before said lead alkyl compounds are added;
   d. controlling the volumetric flow rate of said secondary stream to maintain a constant flow rate through an eductor means for adding said lead alkyl compounds to said secondary stream;

e. controlling the addition of lead alkyl compounds to said secondary stream according to the octane value measured in (a);

f. adjusting the flow rate of said tertiary stream in a constant proportion to the addition rate of said lead alkyl compounds;

g. merging said secondary and tertiary streams to form said lead alkyl containing primary stream of (b) thereby providing a constant lead alkyl concentration in said merged streams.

2. An apparatus for adding a dilute solution containing a constant fraction of lead alkyl compounds to a gasoline stream flowing in a conduit after in-line blending of the hydrocarbon components thereof and before storage of said gasoline comprising in combination:

a. an octane analyzer means for determining the octane value of a sample of said blended gasoline stream;

b. a circulation loop for preparing and introducing of a dilute solution of lead alkyl compounds into said gasoline conduit, said circulation loop comprising, 1. a primary conduit having an inlet end and an outlet end, said inlet end communicating with said gasoline conduit for admitting a fraction of said gasoline stream and said outlet end communicating with said gasoline conduit downstream of said inlet, 2. secondary and tertiary conduits which communicate with said primary conduit for receiving and dividing said gasoline fraction into parallel flow paths, said secondary and tertiary conduits merging to reform said primary conduit after lead alkyl compounds have been added to said gasoline fraction and upstream of the said outlet and, 3. means for transferring said gasoline fraction from said inlet end to said outlet end of the primary conduit, 4. means for dividing and controlling the flow of said gasoline fraction through said secondary and tertiary conduits, 5. means for introducing lead alkyl compounds into said secondary conduit, c. control means for maintaining a constant ratio of lead alkyl compounds introduced by the means of (5) to the flow of said gasoline fraction through said tertiary conduit and thereby providing a dilute solution having a constant fraction of lead alkyl compounds;

d. control means responsive to said octane analyzer means for adjusting the flow of said gasoline fraction through said primary conduit and maintaining the desired concentration of lead alkyl compounds therein.

3. The apparatus of claim 2 further comprising a pump disposed within said circulation loop for transferring said gasoline fraction through said loop.

4. The apparatus of claim 2 wherein said means for introducing lead alkyl compounds into said secondary conduit is an eductor in said secondary conduit operated by the flow through said secondary conduit, a conduit between said eductor and a storage container for lead alkyl compounds for transferring said compounds to said secondary conduit, and a control means for adjusting the flow of said compounds responsive to said octane analyzer means.

5. The apparatus of claim 4 further comprising a pump within said secondary conduit and disposed upstream of said eductor for supplying a constant flow rate of said gasoline fraction to said eductor.

6. The apparatus of claim 2 wherein the means for dividing the flow of said gasoline fraction through said secondary and teritary conduits comprises a control valve disposed in said tertiary conduit and responsive to the control means of (c) to maintain a constant fraction of lead alkyl compounds in said dilute solution.

7. The apparatus of claim 6 further comprising a flow measuring means disposed in said primary conduit downstream of said secondary and tertiary conduits for measuring the flow of said dilute solution and a controller means responsive to said measuring means for adjusting the control valve in said tertiary conduit to maintain a constant supply of dilute solution when no change is indicated by said octane analyzer means.

* * * * *

UNITED STATES PATENT OFFICE
CERTIFICATE OF CORRECTION

PATENT NO. : 3,864,095
DATED : February 4, 1975
INVENTOR(S) : John T. Sinclair; Franklin R. Clark It is certified that error appears in the above-identified patent and that said Letters Patent are hereby corrected as shown below:

On the cover page, at [75], "Franklin P. Clark" should read --Franklin R. Clark--.

Signed and sealed this 27th day of May 1975.

(SEAL)
Attest:

RUTH C. MASON
Attesting Officer

C. MARSHALL DANN
Commissioner of Patents
and Trademarks